United States Patent [19]
Iwane

[11] Patent Number: 5,625,434
[45] Date of Patent: Apr. 29, 1997

[54] AUTOMATIC FOCUS DEVICE AND METHOD

[75] Inventor: Toru Iwane, Kanagawa-ken, Japan

[73] Assignee: Nikon Corporation, Tokyo, Japan

[21] Appl. No.: 426,732

[22] Filed: Apr. 21, 1995

[30] Foreign Application Priority Data

Aug. 31, 1994 [JP] Japan .................. 6-206982

[51] Int. Cl.$^6$ .................................. G03B 3/10
[52] U.S. Cl. ........................................ 396/95
[58] Field of Search ............... 354/400, 402–409, 354/266

[56] References Cited

U.S. PATENT DOCUMENTS 4,980,715  12/1990  Utagawa .

FOREIGN PATENT DOCUMENTS 63148218  6/1993  Japan .

*Primary Examiner*—Safet Metjahic
*Assistant Examiner*—Eric Nelson
*Attorney, Agent, or Firm*—Oliff & Berridge

[57] ABSTRACT

An automatic focusing device drives a focusing lens so as to follow the actual movement of the subject image-forming plane. The automatic focus device has a shooting lens, a camera body, and a CPU in the camera body that computes a defocus amount by conducting focus state detections at a set time intervals. In addition, the CPU reads, via lens connections, the lens movement amount detected by a drive monitor unit in the shooting lens. Furthermore, image plane velocities are computed at set time intervals using the defocus amount and lens movement amount. A determination is made as to whether the computed image plane velocities are suitable for prediction computations, and when the determination is that the velocities are suitable, the hypothetical time $t_{n-1}$ corresponding to the previous image plane velocity computation time is found. Next, after the expected exposure time tr is changed to the hypothetical exposure time tx, the image plane velocity $V_{im}$ at the estimated exposure time is found by substituting this hypothetical exposure time tx into a hyperbolic equation, and the shooting lens is then driven on the basis of this image plane velocity.

21 Claims, 5 Drawing Sheets

AUTOMATIC FOCUS DEVICE AND METHOD

BACKGROUND OF THE INVENTION

1. Field of the Invention

The present invention relates to an automatic focus device that enables the focussing lens included in the shooting lens (photographic lens) to immediately follow a moving subject.

2. Description of Related Art

An automatic focus device has been known from that conducts focus adjustment by automatically moving the focussing lens included in the shooting lens relative to a moving subject (see, for example, Japanese Patent Publication No. 63-148218). With this type of conventional automatic focus device, the defocus amount and velocity of the image-forming plane of focus state detection light rays that have passed through the shooting lens (hereafter referred to as the subject image-forming plane) are repeatedly computed, and driving of the focussing lens is controlled on the basis of the computation results. The defocus amount refers to the relative amount, of deviation and direction of deviation between the subject image-forming plane and the film plane (predicted focal plane).

However, when the subject is not moving at a fixed velocity, it is impossible to correctly drive the focussing lens to the focus position even if the focussing lens is driven on the basis of the previous computation results. In addition, even when the subject moves at a constant velocity, the subject image-forming plane does not necessarily move at a constant velocity. In general, the velocity of the subject image-forming plane (hereinafter called the image plane velocity) becomes faster the nearer the subject comes to the automatic focus device. Conversely, the image plane velocity becomes slower the farther the subject is from the automatic focus device. Accordingly, accurate predictions are not possible when the subject position is predicted simply on the basis of the previous computation results.

Calling v the constant velocity with which the subject is approaching the automatic focus device, and h the distance where the subject is closest (hereafter referred to as the closest position), the position y of the subject image-forming plane (hereafter referred to as the image plane position) is given by formula 1, wherein f is the focus length of the shooting lens and t is time.

$$y = \frac{f^2}{\sqrt{v^2 t^2 + h^2} - f} \tag{1}$$

FIG. 2 is a graph illustrating the relationship given by formula (1) with the time t (in seconds) on the horizontal axis and the image plane position y (in mm) on the vertical axis. The curve in FIG. 2 shows the example wherein the focal length f of the shooting lens is 400 mm, the movement velocity v of the subject is 80 km/h, and the closest position h is 10 m. The height of the peak in the curve shown in the drawing and the slope of the curve will change as the movement velocity v of the subject and the closest position h vary.

As shown in FIG. 2, the curve given by formula (1) reaches the peak at time t=0, and the relationship between the image plane position y and the time t is non-linear. In particular, the change in the image plane position y relative to time t is larger near the peak point in the graph. However, conventional automatic focus devices predict the subject position by approximating each point on the curve in FIG. 2 as being linear, and consequently, when the subject position is predicted near the peak point where the change in slope is large in the curve in FIG. 2, the amount of deviation from the actual subject position becomes large.

It is thus impossible to predict with a high degree of precision future image plane positions even when the positions are predicted using linear approximations on the basis of past image plane velocities or image plane positions. Consequently, an automatic focus device has been proposed that predicts the subject position on the basis of the acceleration of the subject image plane (hereafter referred to as the image plane acceleration). With such a device, a future subject position is predicted using the quadratic equation shown below as formula (2), where the coefficients a, b and c in this equation are set on the basis of the image plane positions detected at three times, two previous times and the present time, and the detection time of each.

$$y = a \cdot t^2 + b \cdot t + c \tag{2}$$

With formula (2), the prediction is equivalent to predicting the subject position on the basis of the image plane acceleration because the image plane position at three different times are taken into consideration. This is because the image plane velocity can be found by integrating the image plane acceleration relative to time, and the image plane position can be found by integrating again relative to time. Consequently, the relationship between the image plane acceleration and the image plane position is a quadratic equation such as shown in formula (2).

If the image plane position is predicted on the basis of formula (2), a prediction with a higher degree of precision is possible than can be achieved by simply predicting the image plane position through linear approximations of the image plane velocity. However, because formula (2) describes a parabola in contrast to the curve shown in FIG. 2 as the relationship between time t and image plane position, the error becomes larger for the following reasons.

As noted above, the relationship between time t and image-forming plane position y is as shown by formula (1), but the focal distance f in the denominator of formula (1) can be ignored because the term is small in comparison with the other terms, so formula (1) can effectively be rewritten as in formula (3).

$$y = \frac{f}{\sqrt{v^2 t^2 + h^2}} \tag{3}$$

Differentiating formula (3) relative to time t, the image plane velocity and image plane acceleration are given by formulae (4) and (5), respectively.

$$\frac{dy}{dt} = \frac{f \cdot v^2 t}{(v^2 t^2 + h^2)^{3/2}} \tag{4}$$

$$\frac{d^2 y}{dt^2} = \frac{f \cdot v^2 (2v^2 t^2 - h^2)}{(v^2 t^2 + h^2)^{5/2}} \tag{5}$$

As shown by formulae (4) and (5), the image plane velocity becomes a higher order function than the image plane position, and the image plane acceleration becomes a still higher order function. In addition, as the time t approaches zero, in other words, as the peak in the curve in FIG. 2 is approached, the image plane acceleration changes greatly in a non-linear way. Accordingly, it is impossible to approximate this kind of curve with a high degree of precision using the parabolic approximation of formula (2). This is because a parabola assumes that the acceleration is constant and that the velocity changes with a fixed ratio, so that the error near the peak of the curve in FIG. 2 will be particularly large.

SUMMARY OF THE INVENTION

It is thus desirable to perform prediction computations on the basis of the image plane acceleration in order to predict with precision future subject positions, but a prediction with a high degree of precision is not possible with the above-described parabolic approximation. In order to predict the subject position with good precision, it is possible to use an approximation given by a curve resembling the curve in FIG. 2, e.g. a hyperbola.

It is an object of the present invention to provide an automatic focus device for an imaging device that drives the focussing lens so that the lens follows the change in position of the actual subject image plane by predicting the movement velocity of the subject image plane on the basis of a hyperbolic function, which takes into consideration the acceleration of the subject image-forming plane and which uses time as a parameter.

In embodiments of the present invention, an automatic focus device includes a focus state detection device that detects the defocus amount corresponding to the deviation between the predicted image-forming plane, which is at the film plane, and the plane of the subject image formed by the photographic optical system; an image-forming plane velocity calculation device that computes the velocity of the aforementioned subject image-forming plane on the basis of the defocus amount detected by the focus state detection device; and a lens drive control device that controls driving of the photographic optical system toward the focus position on the basis of the velocity of the subject image-forming plane computed by the image-forming plane velocity calculation device and the defocus amount detected by the focus state detection device. The device further includes an image-forming plane velocity prediction device that predicts the movement velocity of the subject image-forming plane on the basis of a hyperbolic function, which takes into consideration the movement velocity of the subject image-forming plane and which has time as a parameter. The lens drive control device controls driving of the photographic optical system on the basis of the predicted movement velocity of the subject image-forming plane, the driving effected so that the subject image-forming plane coincides with the predicted image-forming plane. Through this, the above object is achieved.

The image-forming plane prediction device predicts the velocity of the subject image-forming plane at the time of exposure, the lens drive control device controlling the driving of the photographic optical system so that the subject image-forming plane and the predicted image-forming plane coincide at the time of exposure.

The time changing device changes the expected time of exposure to a hypothetical time value that can be substituted as a time parameter into the aforementioned hyperbolic function, and the image-plane velocity prediction device predicts the movement velocity of the subject image-forming plane by substituting this hypothetical time value into the hyperbolic function as a time parameter.

The time changing device may include a first hypothetical time computation device that computes a first hypothetical time on the basis of the velocity computed by the image-forming plane velocity computation device and the time interval for computing the velocity by the image-forming plane velocity computation device; and an addition device that computes the aforementioned hypothetical time value by adding the computed first hypothetical time to the actual time from the point in time when the velocity was computed by the image-forming plane velocity computation device to the estimated time when exposure is conducted.

The image-forming plane velocity prediction device may include a second hypothetical time computation device that computes a second hypothetical time on the basis of a linear function that uses the aforementioned hypothetical time value as a parameter, and predicts the velocity of the subject image-forming plane by substituting this second hypothetical time into the aforementioned hyperbolic function as a time parameter.

The image-forming plane velocity prediction device predicts the velocity of the subject image-forming plane on the basis of a hyperbolic function corresponding to the closest distance between the automatic focus device and the subject being zero.

The image plane velocity prediction device predicts the velocity of the subject image-forming plane on the basis of a hyperbolic function, which has time as a parameter and which takes into consideration the acceleration of the subject image-forming plane. Furthermore, the lens drive controller controls driving of the photographic optical system on the basis of the predicted movement velocity of the subject image-forming plane so that the subject image-forming plane coincides with the predicted image-forming plane.

The image plane velocity prediction device of the invention predicts the velocity of the subject image-forming plane at the time of exposure, and in addition, the lens drive controller controls driving of the photographic optical system so that the subject image-forming plane coincides with the predicted image-forming plane at the time of exposure.

The estimated time for exposure is changed by the time changing device to a hypothetical time value, which can be substituted into the hyperbolic function as the time parameter. Furthermore, the plane velocity prediction device predicts the velocity of the subject image-forming plane by substituting the hypothetical time value into the hyperbolic function as the time parameter.

The time changing device of the invention is comprised of a first hypothetical time computation device and an addition device, and the first hypothetical time computation device computes a first hypothetical time on the basis of the velocity computed by the image plane velocity calculation device and the time interval during which the velocity is computed by the image velocity calculation device. In addition, the addition device computes a hypothetical time value by adding the computed first hypothetical time to the actual time interval from the time when the velocity was computed by the image plane velocity calculation device to the expected time when exposure is conducted.

The image plane velocity prediction device may be comprised of a second hypothetical time computation device, which computes a second hypothetical time on the basis of a linear function that uses the hypothetical time value as a parameter, and predicts the velocity of the subject image-forming velocity by substituting the second hypothetical time value in as the time parameter of the hyperbolic function.

The image plane velocity prediction device of the invention predicts the velocity of the subject image-forming plane on the basis of a hyperbolic function, which approximates the closest distance between the subject and the automatic focus device as zero.

Various of the devices previously recited may be contained in a single central processing unit (CPU) or in different CPU's, which may be mounted in a camera body mount or a lens mount.

BRIEF DESCRIPTION OF THE DRAWINGS

The invention will be described in detail with reference to the following figures in which like reference numerals refer to like elements, and wherein.

DETAILED DESCRIPTION OF PREFERRED EMBODIMENTS

Figure 1:
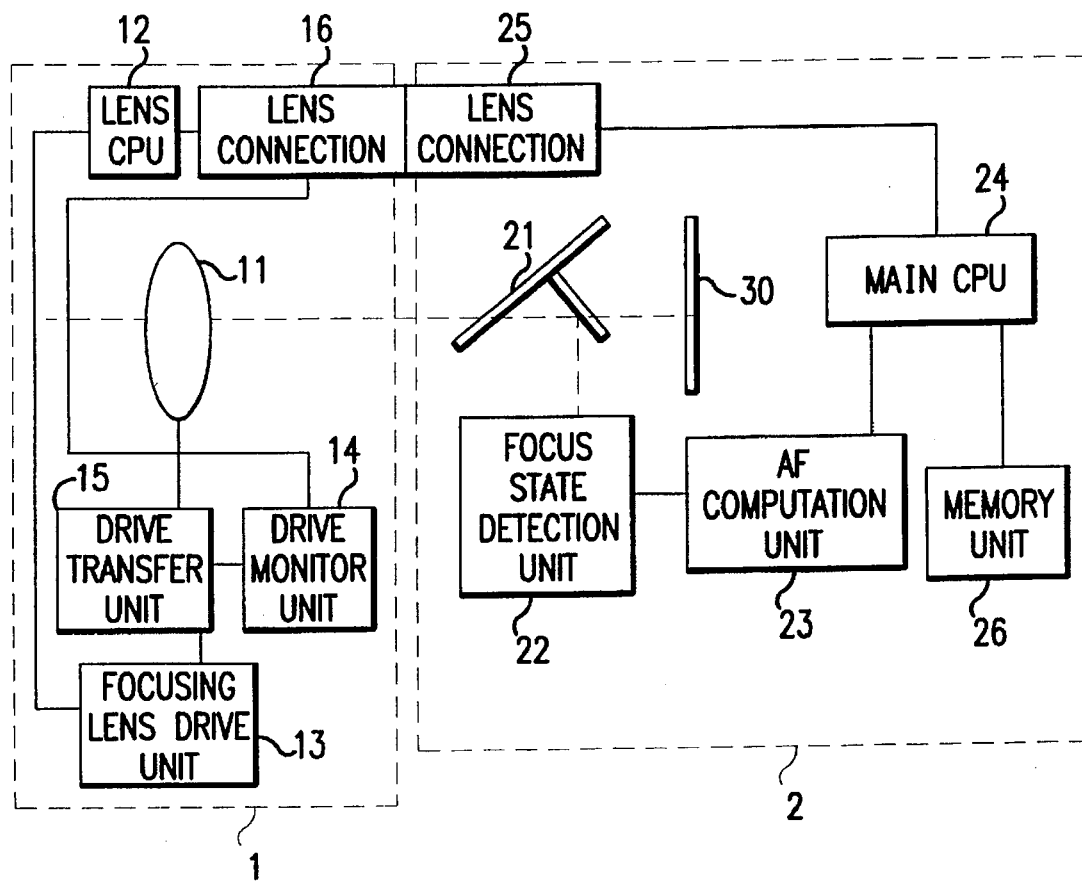
FIG. 1 is a block diagram of a first embodiment of the automatic focus device according to the present invention.

FIG. 1 is a block diagram of a first embodiment of the automatic focus device of the present invention, wherein the automatic focus device is applied to a camera.

With reference to FIG. 1, a shooting lens structure 1 includes a focussing lens 11, a lens CPU 12, a focussing lens drive unit 13, a drive monitor unit 14, a drive transfer unit 15, and a lens connection 16. Of these components, the focussing lens 11 is capable of movement on the optical axis of the shooting lens structure 1. The focussing lens drive unit 13 is comprised of a motor and controls the drive direction, drive velocity and drive amount of the focussing lens 11. The drive monitor unit 14 detects the lens movement amount of the focussing lens 11 and sends the results of this detection to the camera body 2 via the lens connection 16. The drive monitor unit 14 may detect the absolute value of the lens movement amount, or may detect the relative value of the lens movement amount through a pulse number output from an encoder or the like.

Inside the camera body 2 are a quick return mirror 21, which reflects some light rays from the subject and allows some light rays to pass through to film 30 at a film plane; a focus state detection unit 22 that includes a focus state detection optical system and an image sensor; an AF (auto focus) computation unit 23 that computes the defocus amount on the basis of the detection results from the focus state detection unit 22; a main CPU 24 that controls the operation of the device; a lens connection 25 that conducts communication with the shooting lens structure 1; and a memory unit 26 that stores the results of computations performed by the main CPU 24. In this memory unit 26 are stored the focus state detection time, the defocus amount, the lens movement amount or the relative value corresponding to such, and the results of computing the image plane position, the items being stored as a set.

With the automatic focus device configured as shown in FIG. 1, the main CPU 24 predicts the image plane velocity at the time of exposure through the below-described method.

With the above described formula (1), the focal length f of the shooting lens 1 is short in comparison with the distance to the subject, and because of this, the focal length f in the denominator of formula (1) can be ignored. In addition, when the moving subject is actually followed, it is not necessary to follow the subject as far as the area near the peak of the rise in the curve shown in FIG. 2, and because no problems exist in practice if the subject is followed partway up this rise, it is possible to approximate the closest distance h between the subject and the camera as zero. Furthermore, when the closest distance h is larger than zero, the rise in FIG. 2 becomes shorter and the slope of the curve becomes more gentle, and because of this, it becomes possible to predict the image plane position with good precision through the described parabolic approximation without taking into consideration the image plane acceleration. Even here, it is desirable to perform computations by taking the closest distance h to be zero.

When the described approximations are made, formula (1) is changed to formula (6) below.

$$y = \frac{f^2}{vt} \quad (6)$$

The image plane velocity shown by formula (7) below can be found by differentiating formula (6) once, and the image plane acceleration shown by formula (8) below can be found by differentiating twice.

$$\frac{dy}{dt} = -\frac{f^2}{vt^2} \quad (7)$$

$$\frac{d^2y}{dt^2} = \frac{2f^2}{vt^3} = -\frac{2}{t} \cdot \frac{dy}{dt} \quad (8)$$

In this instance, calling $V_n$ the image plane velocity at the nth measurement, $\alpha$ the image plane acceleration and $\tau$ the measurement time interval, the image plane velocity $V_n$ is given by formula (9) below.

$$V_n = V_{n-1} + \alpha \tau = V_{n-1} - \frac{2}{t_n} V_{n-1} \tau = V_{n-1}\left(1 - \frac{2}{t_n}\tau\right) \quad (9)$$

Rearranging the terms in formula (9), the time $t_n$ is given by formula (10) below.

$$t_n = \frac{-2 \cdot V_{n-1} \cdot \tau}{V_n - V_{n-1}} \quad (10)$$

The time $t_n$ found using formula 10 is a hypothetical time and will differ from the actual time. Hereafter, the time $t_n$ found using formula (10) will be referred to as the hypothetical time.

Next, finding the hypothetical time $t_{n-1}$ prior to hypothetical time $t_n$ using formula (10) yields formula (11) below.

$$t_{n-1} = \frac{-2 \cdot V_{n-2} \cdot \tau}{V_{n-1} - V_{n-2}} \quad (11)$$

Formula (11) becomes formula (12) when the measurement time interval $\tau$ is used. This formula (12) provides that the hypothetical time $t_n$ corresponding to the present time can be computed using the first and second previous image plane velocities $v_{n-1}$ and $v_{n-2}$.

$$t_n = \frac{-2 \cdot V_{n-2} \cdot \tau}{V_{n-1} - V_{n-2}} + \tau \quad (12)$$

Substituting formula (12) into formula (9), it becomes possible to predict the image plane velocity at hypothetical time $t_n$, and through this, it becomes possible to predict the first subsequent image plane velocity from the first previous image plane velocity.

When actually predicting the image plane position, the time that is to be predicted is not necessarily the next focus state detection time. When continuously repeating the cycle of predicting and driving, various possibilities exist, including predicting the image plane position at the present time, predicting the image plane position at the time of starting the next lens driving, or predicting the image plane position at a time between these. There are primarily two reasons, described below, that it is necessary to predict the image plane position at the present time.

First, because some time is required from when focus state detection is conducted until the completion of computation of the image plane position, the subject moves during this interval, and the actual image plane position upon completion of computation is not known.

Second, when the image plane position is predicted on the basis of the results of computing the image plane velocity, the image plane velocity at an intermediate time between the current (present) time and the prior time is in general taken to be the standard, and this will differ by a substantial amount from the image plane velocity at the present time.

Because the times for predicting the image plane position and/or the image plane velocity thus differ by case, when the predicted time $t_n$ of the image plane velocity is expressed in terms of the elapsed time $\tau'$ from the present time, formula 13 results.

$$t_n = \frac{-2 \cdot V_{n-1} \cdot \tau}{V_n - V_{n-1}} + \tau' \tag{13}$$

When the image plane velocity $v_{im}$ is found using formula 13, formula 14 results.

$$V_{im} = V_n \left(1 - \frac{2}{t_n} \tau'\right) \tag{14}$$

However, when the image plane velocity is actually predicted, it is more desirable to predict the average velocity until the predicted time or the image plane velocity at the intermediate position at the hypothetical time than to predict the image plane velocity at the predicted time. Here, averaging formula (14) yields formula (15) below.

$$V_{im'} = V_n \left(1 - \frac{1}{t_n} \tau'\right) \tag{15}$$

The main CPU 24 can predict the image plane position at the time of exposure with good precision by driving the focussing lens 11 from the present measurement time until the exposure time on the basis of formula (15).

When the hypothetical time $t_n$ is computed on the basis of formula (13), the first and second previous image plane velocities $v_{n-1}$ and $v_{n-2}$ are transmitted from the shooting lens structure 1 via the lens connection 25, and the computation is performed using the defocus amount data, lens movement amount data and time data stored in the memory unit 26.

For example, calling bf0, bf1, bf2, ... the defocus amount data in order from the newest to the oldest, calling d0, d1, d2 ... the lens movement amount data, and calling tag0, tag1, tag2, ... the measurement base time data, and taking the lens movement amount data and the defocus amount data to have the same dimensions for convenience, the current image plane velocity $V_0$ and the previous image plane velocity $V_1$ are given by formulae 16 and 17, respectively.

$$V_0 = \frac{(bf0 + d0) - (bf1 + d1)}{tag0 - tag1} \tag{16}$$

$$V_1 = \frac{(bf1 + d1) - (bf2 + d2)}{tag1 - tag2} \tag{17}$$

In place of formulae (16) and (17), it would also be appropriate to find these values such that the defocus amount data and the lens movement amount overlap. In other words, it would also be appropriate to find the image plane velocity $V_0$ using defocus amounts bf0 and bf2 and to find the image plane velocity $V_1$ using defocus amounts bf1 and bf3.

Figure 3:
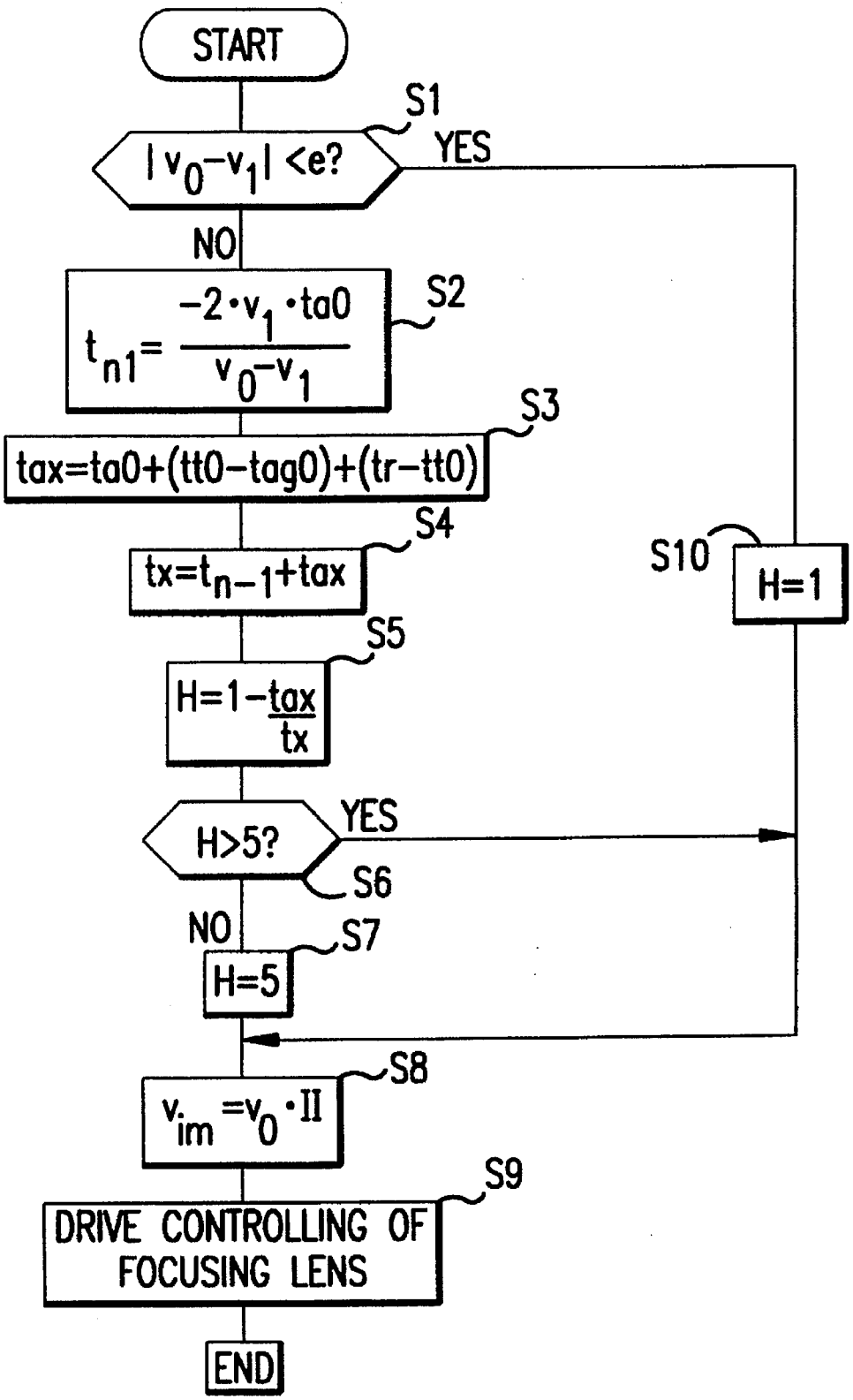
FIG. 3 is a flowchart showing the actions of the main CPU in a first embodiment.

FIG. 3 is a flowchart showing the actions of the main CPU 24 in the camera body 2 and the actions of the first embodiment will be described with reference to this flowchart. This flowchart presumes the case of continuous photography, but the main CPU 24 conducts the same processes even in the case of a single photograph.

Because predictions can be made using essentially the same method in both the case of continuously predicting the image plane position of the subject and in the case of predicting the image plane position at the time of exposure, the only difference being that the predicted time will differ, here the description is given of an example wherein the image plane position is predicted at the time of exposure.

The main CPU 24 starts the processes in the flowchart in FIG. 3 when a release button is depressed halfway.

Figure 4:
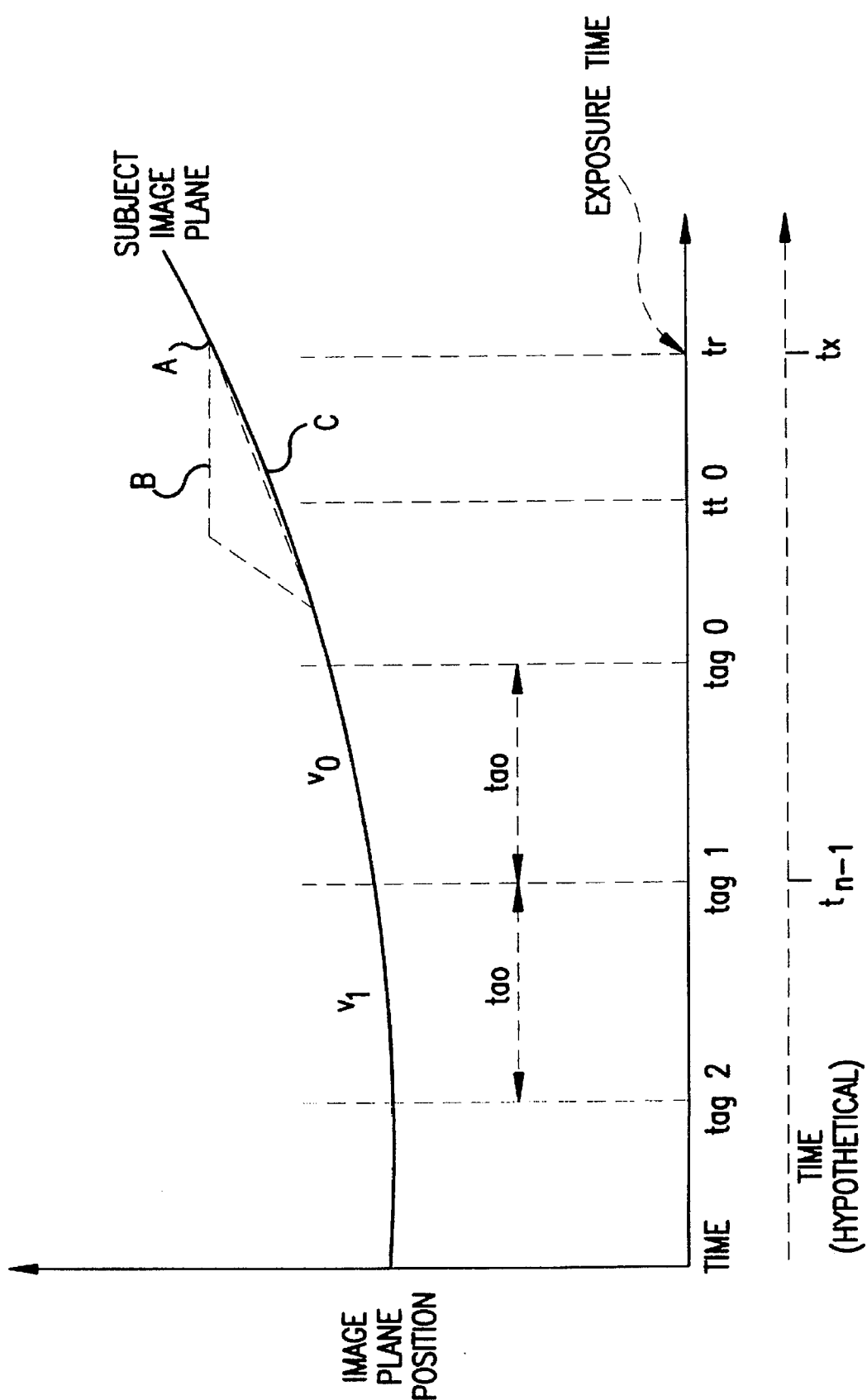
FIG. 4 is an illustration showing the change in the actual image plane position of the subject and the drive condition of the focussing lens.

FIG. 4 illustrates how the image plane position changes with time. The horizontal axis in FIG. 4 shown by the solid line indicates real time, while the horizontal axis shown by the dashed line indicates the hypothetical time used in computations. The curve A in the drawing indicates the change in the actual image plane position of the subject.

In addition, tag0, tag1 and tag2 in FIG. 4 indicate the current, first previous and second previous measurement base times, respectively and the defocus amounts at these times are respectively designated bf0, bf1 and bf2. In addition, the time interval between each of these measurement base times is called ta0, the average image plane velocity between times tag0 and tag1 is called $V_0$, and the average image plane velocity between times tag1 and tag2 is called $V_i$. Furthermore, the present time is called tt0, and the expected exposure time is called tr.

Hereafter, the processes in the flowchart in FIG. 3 will be described with reference to FIG. 4.

In step S1 of FIG. 3, a determination is made as to whether the most recent (current) image plane velocity $V_0$ found using formula (16) and the first previous image plane velocity $V_1$ found using formula (17) are suitable for prediction computations with the present invention. Specifically, these values are determined to be unsuitable for prediction computations if the absolute value of the difference between the image plane velocities $V_0$ and $V_1$ is smaller than a preset value e. This is because when the difference between the image plane velocities $V_0$ and $V_1$ is small, the image plane acceleration can be considered small, so it is not necessary to take image plane acceleration into consideration in prediction computations. In addition, when the image plane acceleration is taken into consideration in predicting the image plane position in this situation, there are concerns that precision could actually worsen due to computation errors.

The difference between image plane velocities $V_0$ and $V_1$ is found in step S1, but it would also be appropriate to estimate the reliability of data by finding the ratio of image plane velocity $V_0$ to $V_1$ and to conduct prediction computations with the present invention only when the reliability is high. Specifically, it would be appropriate to determine that the reliability is high only when the ratio of image plane velocity $V_0$ to $V_1$ is 1 or close to 1.

If the judgement in step S1 is negative, that is, when the determination is that the image plane velocities $V_0$ and $V_1$ are suitable for predicting computations, the CPU moves to step S2 and finds the hypothetical time $t_{n-1}$ on the basis of formula (18) below. This hypothetical time $t_{n-1}$ corresponds to actual time tag1, as shown in FIG. 4.

$$t_{n-1} = \frac{-2 \cdot V_1 \cdot ta0}{V_0 - V_1} \quad (18)$$

Formula (18) corresponds to formula (11) wherein $V_{n-1}$ has been replaced by $V_0$, $V_{n-2}$ has been replaced by $V_1$ and $\tau$ has been replaced by ta0.

In step S3, the actual time interval tax from the previous measurement base time tag1 until the expected exposure time tr is found, as shown by formula (19).

$$tax = ta0 + (tt0 - tag0) + (tr - tt0) \quad (19)$$

The time interval tax is the sum of the measured time interval ta0 between the current and the previous measurements, the time interval (tt0–tag0) between the present time tt0 and the current measurement time, and the time interval (tr–tt0) between the expected exposure time tr and the present time tt0. The expected exposure time tr is a predetermined time that takes into consideration the time needed for the quick return mirror 21 to be raised.

In step S4, the hypothetical time $t_{n-1}$ found in step S2 and the time interval tax found in step S3 are added, as shown by formula 20, to find the hypothetical time tx (hereafter referred to as the hypothetical exposure time) corresponding to the exposure time.

$$tx \leq t_{n-1} + tax \quad (20)$$

In step S5, the value H, which is the quantity in the parentheses on the right hand side of formula (15), is computed, as shown by formula (21).

$$H = 1 - \frac{tax}{tx} \quad (21)$$

When the image plane position changes in bursts or when a large error in computation results is created through some source, the value H becomes a value larger than 1, and because of this, an upper limit to the value H is set, and when the value H exceeds this upper limit value, the value H is constrained to be a preset value, e.g. 5.

In step S6, the upper limit value of the value H is set as 5, but this is merely an example, as the upper limit may also be set as some value other than 5.

When the determination in step S6 is affirmative, that is, when the value H exceeds 5, the value H is set to 5 in step S7 after which the CPU moves to step S8, while on the other hand, if the determination in step S6 is negative, the CPU moves directly to step S8.

In step S8, the image plane velocity at exposure time $t_r$ is found on the basis of formula (22) below.

$$V_{im} = V_0 \cdot H \quad (22)$$

In step S9, the lens movement amount is computed on the basis of the predicted image plane velocity $V_{im}$ and the detected defocus amount, and this value is sent to the lens CPU 12 via the lens connections 16 and 25. The lens CPU 12 sends to the focussing lens drive unit 3 a signal corresponding to the lens movement amount received, and thereby drives the focussing lens 11.

When the determination in step S1 is affirmative, that is, when it is determined that the image plane velocities found using formulae (16) and (17) are unsuitable for prediction computations, the CPU moves to step S10 where the value H is set to 1, and then moves to step S8. Through this, the current image plane velocity $V_0$ is set as the image plane velocity $V_{im}$ at the time of exposure without taking acceleration into consideration.

To summarize the above actions of the first embodiment, the main CPU 24 in the camera body 2 conducts focus state detections at a preset time interval, computes a defocus amount, and, through lens connections 16 and 25, reads the lens movement amount detected by the drive monitor unit 14 in the shooting lens structure 1. Furthermore, the CPU computes image plane velocities at a preset time interval on the basis of this defocus amount and lens movement amount.

Next, the determination is made as to whether the computed image plane velocities are suitable for prediction computations, and when the determination is that these velocities are suitable, the hypothetical time $t_{n-1}$ corresponding to the time of the previous image plane velocity computation is found. Next, after the expected exposure time tr has been changed to the hypothetical exposure time tx, this hypothetical exposure time tx is substituted into the hyperbolic function of formula (15), the image plane velocity $V_{im}$ at the exposure time is computed, and the focussing lens 11 is driven on the basis of this value.

Figure 2:
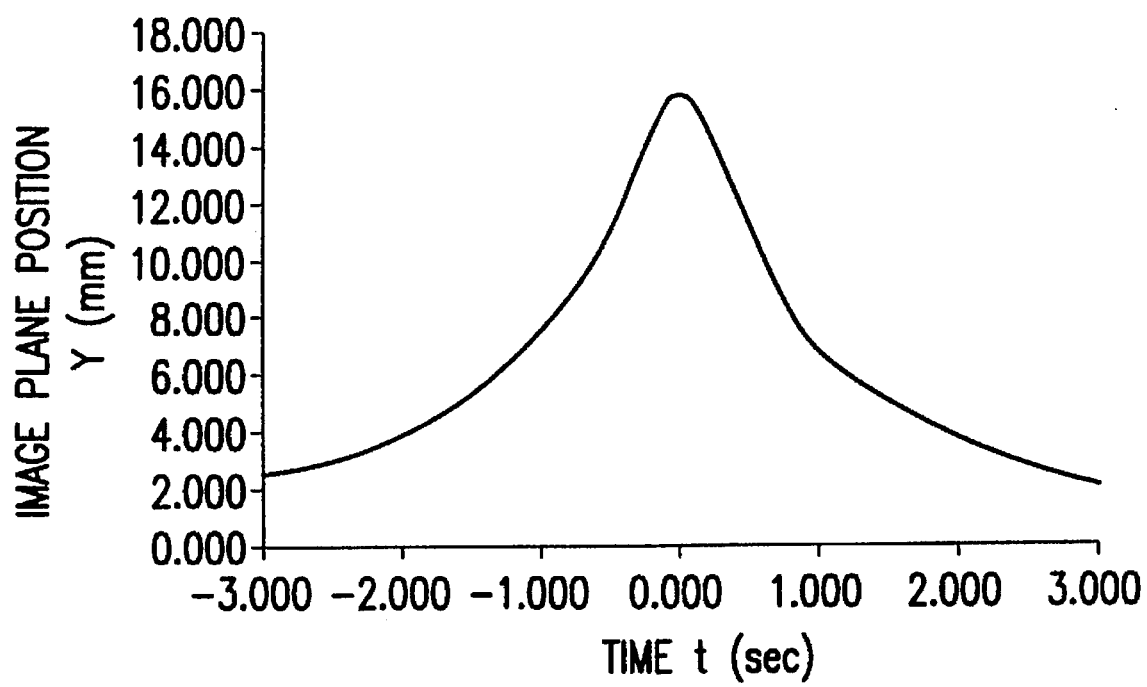
FIG. 2 is an illustration showing the change in the actual image plane position of the subject.

In this way, with the first embodiment, the image plane velocity at the time of exposure is predicted on the basis of the hyperbolic function of formula (15), which takes into consideration the image plane acceleration of the subject, and consequently, it is possible to cause the focussing lens 11 to move so as to fit the curve in FIG. 2, which shows the actual change in the image plane position. Through this, with the present invention, the focussing lens 11 is driven at a velocity close to that of the change in the actual image plane position as shown by dashed line C in FIG. 4, in contrast to the conventional rapid driving of the focussing lens 11 before the exposure time tr as shown by dashed line B in FIG. 4. Consequently, it is possible to make the difference in inclination between dashed line C and curve A, which shows the actual change in the image plane position, small near the exposure time. Accordingly, even when the exposure time tr deviates somewhat, the amount of deviation of the image plane position is markedly smaller than in conventional models.

In a second embodiment of the invention, a device is provided wherein the focussing lens drive unit 13, which drives the focussing lens 11, is provided inside the camera body 2.

Figure 5:
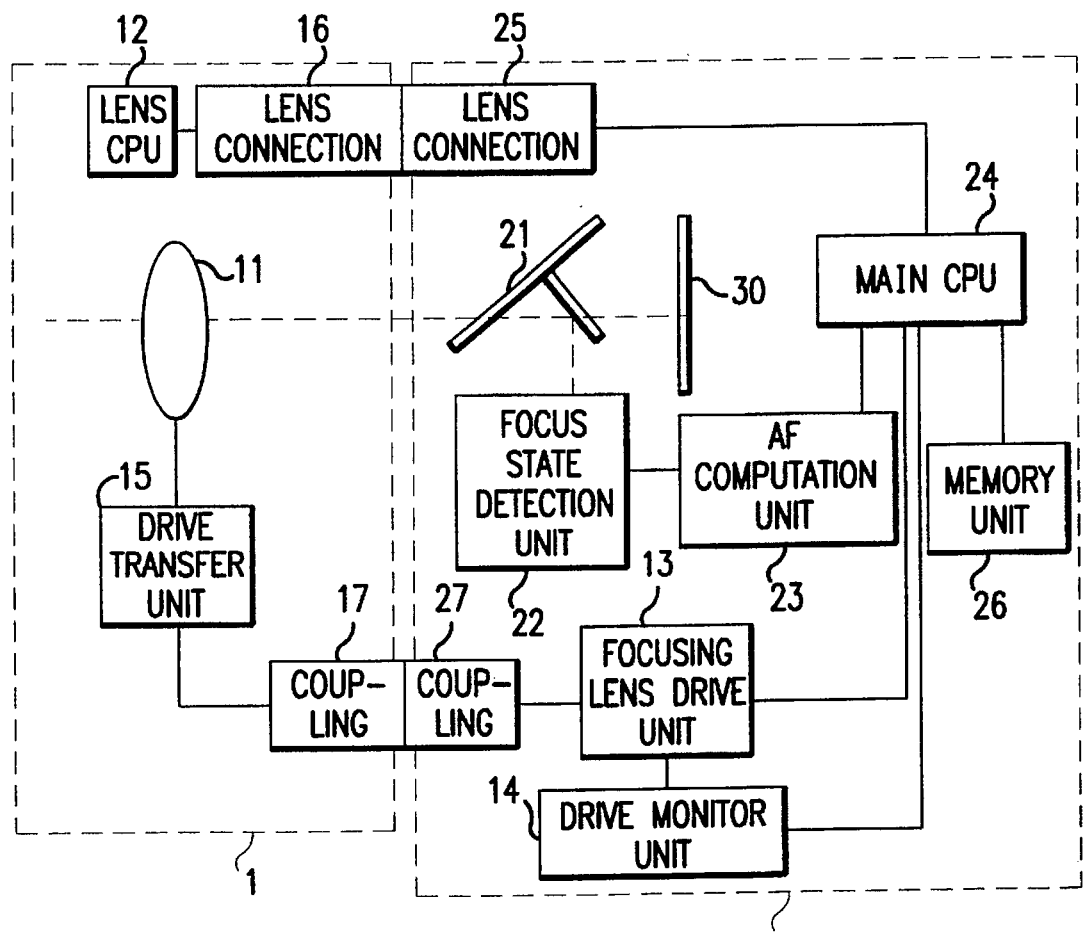
FIG. 5 is a block diagram of a second embodiment of the automatic focus device according to the present invention.

FIG. 5 is a block diagram of the automatic focus device of the second embodiment. In FIG. 5, components that are equivalent to those in FIG. 1 are represented by same reference numbers, and the explanation that follows centers on the points of difference.

As shown in FIG. 5, the focussing lens drive unit 13 and the drive monitor unit 14 of the second embodiment are provided inside the camera body 2. In addition, couplings 17 and 27 are provided on both the shooting lens structure 1 and the camera body 2 to transmit drive information concerning the focussing lens 11 from the camera body 2 to the shooting lens structure 1.

The main CPU 24 of the second embodiment executes processes similar to those shown in FIG. 3, and therefore, further description of such is omitted here.

In the first embodiment and in this second embodiment, it would also be appropriate to directly predict the image plane position instead of predicting the image plane velocity at the exposure time and to include appropriate devices such as a CPU to obtain the predictions for computational purposes. In the case of a camera wherein focus state detection is conducted by intermittently driving the focussing lens 11, it is preferable to use this direct method. In particular, when the lens movement amount can be found as an absolute value, it is preferable to directly predict the image plane position.

Calling b1 the image plane position at the hypothetical time $t_{n-1}$ corresponding to the previous measurement time, the image plane position at the hypothetical exposure time tx can be found using formula (23) below.

$$bx = \frac{b1 \cdot t_{n-1}}{tx} \quad (23)$$

Formula (23) is an equation used to find the image plane position at the hypothetical time $t_{n-1}$ using proportional interpolation. On the other hand, the image plane position bn at the present time tt0 can be found using formula (24) below.

$$bn = \frac{b1 \cdot t_{n-1}}{ta0 + tt0 - tag0} \quad (24)$$

From this formula (24), it is possible to find the present defocus amount if the lens movement amount data found by the drive monitor unit 14 is subtracted.

On the other hand, when the lens movement amount is detected using an encoder, it is impossible to compute the absolute value of the lens movement amount, and consequently, an offset amount c indicating the difference between the absolute value and the relative value of the lens movement amount output from the encoder is found using formula (25) below, and the absolute value of the lens movement amount may then be found by subtracting this offset amount c from the encoder output.

$$c = -\frac{t_{n-1}(b1 - b0) - b0}{\tau} \quad (25)$$

In this way, if the image plane position is predicted directly without predicting the image plane velocity at the exposure time, the time needed for prediction computations can be shortened, which is particularly beneficial when it is desired to drive the focussing lens 11 at high velocity such as during continuous photography.

In a third embodiment of the present invention, a device corrects the hypothetical time used in prediction computations. This third embodiment has the same configuration as the first and second embodiments, and the processes of the main CPU 24 are essentially the same also, so the description that follows will explain only the points of difference.

With the described first embodiment, the image plane position is computed by conducting focus state detection at a preset time interval, as shown in FIG. 4. In other words, the first embodiment performs computations on the basis of data that is actually detected discretely, although the image plane velocity is predicted on the basis of the hyperbolic function of formula (15), which is a continuous function. Accordingly, various errors may be included in the computation results. These errors are not significant away from the peak of the curve in FIG. 2, but the errors may become significant near the peak of the curve where the change in image plane position relative to time is large.

One method of compensating for this is to make a linear correction to the hypothetical exposure time tx found using formula (20). In other words, the hypothetical exposure time tx may be corrected on the basis of formula (26) below.

$$tx' = (tx + b) \quad (26)$$

The coefficients a and b in formula (26) may be found through experimentation taking into consideration the various conditions such as the time interval wherein focus state detection is conducted and the focal length of the focussing lens 11 in use. For example, according to experiments conducted by the applicant, when coefficient a was 0.8 and coefficient b was 18 ms and the cycle time was 100 ms, extremely good results were obtained when the focal length of the focussing lens was no less than 30 mm.

In this way, with the third embodiment a linear correction is made to the hypothetical exposure time tx, and consequently, errors that may be created by conducting focus state detection at discrete times can be mitigated. Accordingly, an even more precise subject position can be predicted by combining the third embodiment with either the first or the second embodiment.

In each of the described embodiments, the image plane velocity at the exposure time is predicted on the basis of the hyperbolic function of formula (15), but the hyperbolic function used in predicting the image plane velocity need not be identical to that of formula (15). In other words, the function may be any hyperbolic function so long as the function approximates the curve in FIG. 2. Or, the most suitable hyperbolic function may be selected using the focal length or the like of the shooting lens in use.

In addition, with the described embodiments, the image plane velocity at the exposure time is predicted, but the predicted time is not limited to the exposure time.

In each of the described embodiments, the prediction computations were conducted by the main CPU 24 in the camera body 2, but these computations may also be conducted by the lens CPU 12.

In the described embodiments, the description was of an example wherein the automatic focus device of the present invention is applied to a camera, but the device may also be applied to systems other than cameras.

In embodiments configured as above, the focus state detection unit 22 and the AF computation unit 23 correspond to the focus state detection device or means, the main CPU 24 corresponds to the image plane velocity computation device or means, the focussing lens drive unit 3 corresponds to the lens drive control device or means, the flowchart in FIG. 3 corresponds to the image plane velocity prediction device or means, steps S2 to S4 in FIG. 3 correspond to the time changing device or means, step S2 in FIG. 3 corresponds to the first hypothetical time computation device or means, and steps S3 and S4 in FIG. 3 correspond to the addition device or means.

As explained in detail above, with the present invention, the velocity of the subject image-forming plane is predicted on the basis of a hyperbolic function that uses time as a parameter and that takes into consideration the acceleration of the subject image-forming plane, and consequently, it is possible to drive the focussing lens so as to coincide with the actual movement of the subject. Through this, when using a telephoto lens or the like with a long focal length to photograph a subject such as a car or the like that is moving at high velocity, with the present invention, focussing can be effected with precision; whereas with prior art devices, the acceleration of the subject image-forming plane was not adequately taken into consideration, and because of this, focussing could not be effected correctly as the subject approached the automatic focus device.

With the present invention, the velocity of the subject image-forming plane at the time of exposure may be predicted, and driving of the photographic optical system is controlled so that the subject image-forming plane at the time of exposure coincides with the predicted image-forming plane. Consequently, photographs that are always in focus can be taken even with rapid movement of the subject.

With the present invention, the expected time at which exposure is conducted may be changed to a hypothetical time value that can be substituted into the hyperbolic function as the time parameter, and consequently, it is possible to compute the movement velocity of the subject image-forming plane on the basis of the hyperbolic equation even when the actual time and the time parameter of the hyperbolic equation do not match.

With the present invention, the hypothetical time may be corrected using a linear function, and consequently, errors that are created by conducting focus state detection computation at discrete times can be mitigated.

With the present invention, the velocity of the subject image-forming plane may be predicted on the basis of a hyperbolic function that approximates as zero the closest distance between the subject and the automatic focus device, and consequently, it is possible to make computations that adequately take into consideration the acceleration of the subject image-forming plane.

While this invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the invention as defined in the following claims.

What is claimed is:

1. An automatic focus device for an imaging device having a film plane and a photographic optical system for forming an image of a subject in a region of the film plane, said automatic focus device comprising:

a focus state detection device that detects a defocus amount between said film plane and an image-forming plane of the image formed by said photographic optical system;

an image-forming plane velocity calculation device that computes a velocity of said image-forming plane based on the defocus amount detected by said focus state detection device;

a lens drive control device that controls driving of said photographic optical system toward a focus position based on the velocity of said image-forming plane computed by said image-forming plane velocity calculation device; and an image-forming plane velocity prediction device that predicts the velocity of said image-forming plane based on a hyperbolic function of said computed velocity of said image-forming plane and on time, wherein said lens drive control device controls driving of said photographic optical system based on said predicted velocity of said image-forming plane so that said image-forming plane and said film plane coincide.

2. An automatic focus device according to claim 1, wherein said image-forming plane velocity prediction device predicts the velocity of said image-forming plane at exposure, and wherein said lens drive control device controls the driving of said photographic optical system so that said image-forming plane and said film plane coincide at exposure.

3. An automatic focus device according to claim 1, further comprising a time changing device that provides a hypothetical time value as input to said image-forming plane velocity prediction device for use in predicting the velocity of said image-forming plane based on said hyperbolic function.

4. An automatic focus device according to claim 3, wherein said time changing device comprises a first hypothetical time computation device for computing a first hypothetical time based on said computed velocity; and an addition device that computes said hypothetical time value by adding said computed first hypothetical time to an actual time from the time when the velocity of said image-forming plane was computed by said image-forming plane velocity calculation device to an estimated time of exposure.

5. An automatic focus device according to claim 4, wherein said image-forming plane velocity prediction device comprises a second hypothetical time computation device that computes a second hypothetical time based on a linear function of said hypothetical time value and that predicts the velocity of said image-forming plane based on said hyperbolic function using said second hypothetical time as the time for said hyperbolic function.

6. An automatic focus device according to claim 5, wherein said image-forming plane velocity prediction device predicts the velocity of said image-forming plane based on a hyperbolic function corresponding to a closest distance between the automatic focus device and said subject being zero.

7. An automatic focus device for an imaging device having a film plane and a photographic optical system for forming an image of a subject in a region of the film plane, said automatic focus device comprising:

a focus state detection device that detects a defocus amount between said film plane and an image-forming plane of the image formed by said photographic optical system;

an image-forming plane velocity calculation device that computes a velocity of said image-forming plane based on the defocus amount detected by said focus state detection device;

a lens drive control device that controls driving of said photographic optical system toward a focus position based on said computed velocity; and an image-forming plane position prediction device that predicts a position of said image-forming plane based on a hyperbolic function of said computed velocity and on time, wherein said lens drive control device controls driving of said photographic optical system based on said predicted position of said image-forming plane so that said image-forming plane and said film plane coincide.

8. An automatic focus device for an imaging device having a film plane and a photographic optical system for forming an image of a subject in a region of the film plane, said automatic focus device comprising:

focus state detection means for detecting a defocus amount between said film plane and an image-forming plane of the image formed by said photographic optical system;

image-forming plane velocity calculation means for computing a velocity of said image-forming plane based on the defocus amount detected by said focus state detection means;

lens drive control means for controlling driving of said photographic optical system toward a focus position based on said computed velocity; and image-forming plane velocity prediction means for predicting the velocity of said image-forming plane based on a hyperbolic function of said computed velocity and on time, wherein said lens drive control means controls driving of said photographic optical system based on said predicted velocity of said image-forming plane so that said image-forming plane and said film plane.

9. An automatic focus device system according to claim 8, wherein said image-forming plane velocity prediction means predicts the velocity of said image-forming plane at exposure, and wherein said lens drive control means controls the driving of said photographic optical system so that said image-forming plane and said film plane coincide at exposure.

10. An automatic focus device according to claim 8, further comprising time changing means for providing a hypothetical time value as input to said image-forming plane velocity prediction means for use in predicting the velocity of said image-forming plane based on said hyperbolic function.

11. An automatic focus device according to claim 10, wherein said time changing means comprises a first hypothetical time computation means for computing a first hypothetical time based on said computed velocity; and an addition means for computing said hypothetical time value by adding said computed first hypothetical time to an actual time from the time when the velocity of said image-forming plane was computed by said image-forming plane velocity calculation means to an estimated time of exposure.

12. An automatic focus device according to claim 11, wherein said image-forming plane velocity prediction means comprises a second hypothetical time computation means that computes a second hypothetical time based on a linear function of said hypothetical time value and that predicts the velocity of said image-forming plane based on said hyperbolic function using said second hypothetical time as the time for said hyperbolic function.

13. An automatic focus device according to claim 12, wherein said image-forming plane velocity prediction means predicts the velocity of said image-forming plane based on a hyperbolic function corresponding to the closest distance between the automatic focus device and said subject being zero.

14. An automatic focus device for an imaging system for forming an image of a subject in a region of the film plane, said automatic focus device comprising:

focus state detection means for detecting a defocus amount between said film plane and an image-forming plane of the subject image formed by said photographic optical system;

image-forming plane velocity calculation means for computing a velocity of said image-forming plane based on the defocus amount detected by said focus state detection means;

lens drive control means for controlling driving of said photographic optical system toward a focus position based on said computed velocity; and image-forming plane position prediction means for predicting a position of said image-forming plane based on a hyperbolic function of said computed velocity and on time, wherein said lens drive control means controls driving of said photographic optical system based on said predicted position of said image-forming plane so that said image-forming plane and said film plane coincide.

15. A method of automatically focusing an imaging device having a film plane and a photographic optical system for forming an image of a subject in the region of the film plane, said method comprising the steps of:

detecting a defocus amount between said film plane and an image-forming plane of the image formed by said photographic optical system;

computing a velocity of said image-forming plane based on the defocus amount detected in said detecting step;

controlling a driving of said photographic optical system toward a focus position based on the velocity of said image-forming plane computed in said computing step; and predicting the velocity of said image-forming plane based on a hyperbolic function of the velocity of said image-forming plane computed in said computing step and on time, wherein said controlling step comprises controlling driving of said photographic optical system based on said predicted velocity of said image-forming plane so that said image-forming plane and said film plane coincide.

16. A method according to claim 15, wherein said predicting step comprises predicting the velocity of said image-forming plane at exposure, and wherein said controlling step comprises controlling the driving of said photographic optical system so that said image-forming plane and said film plane coincide at exposure.

17. A method according to claim 15, further comprising the step of providing a hypothetical time value as input to said step of predicting the velocity of said image-forming plane based on said hyperbolic function.

18. A method according to claim 17, further comprising the steps of:

computing a first hypothetical time based on the velocity computed in said computing step; and computing said hypothetical time value by adding said computed first hypothetical time to an actual time from the time when the velocity of said image-forming plane was computed in said velocity computing step to an estimated time of exposure.

19. A method according to claim 18, further comprising the steps of:

computing a second hypothetical time based on a linear function of said hypothetical time value; and predicting the velocity of said image-forming plane based on said hyperbolic function using said second hypothetical time as the time for said hyperbolic function.

20. A method according to claim 19, wherein said predicting step comprises predicting the velocity of said image-forming plane based on a hyperbolic function corresponding to a closest distance between the imaging device and said subject being zero.

21. A method of automatically focusing an imaging device having a film plane and a photographic optical system for forming an image of a subject in a region of the film plane, said method comprising the steps of:

detecting a defocus amount between said film plane and an image-forming plane of the image formed by said photographic optical system;

computing a velocity of said image-forming plane based on the defocus amount detected in said detecting step;

controlling driving of said photographic optical system toward a focus position based on the velocity of said image-forming plane computed in said computing step; and predicting a position of said image-forming plane based on a hyperbolic function of the velocity of said image-forming plane computed in said computing step and time, wherein said controlling step comprises controlling driving of said photographic optical system based on said predicted position of said image-forming plane so that said image-forming plane and said film plane coincide.

* * * * *